No. 809,126.  
PATENTED JAN. 2, 1906.  
L. McCARTHY.  
ELECTRIC LIGHT FIXTURE INSULATOR.  
APPLICATION FILED FEB. 2, 1905.

Witnesses:
J. Henry Parker
Alice H. Morrison

Inventor:
Louis McCarthy
by MacLeod, Calver, Cushman & Dike
Attorneys.

UNITED STATES PATENT OFFICE.

LOUIS McCARTHY, OF BOSTON, MASSACHUSETTS.

ELECTRIC-LIGHT-FIXTURE INSULATOR.

No. 809,126. Specification of Letters Patent. Patented Jan. 2, 1906.

Application filed February 2, 1905. Serial No. 243,836.

*To all whom it may concern:*

Be it known that I, LOUIS MCCARTHY, a citizen of the United States, residing at Boston, county of Suffolk, State of Massachusetts, have invented a certain new and useful Improvement in Electric-Light-Fixture Insulators, of which the following is a specification, reference being had therein to the accompanying drawings.

My present invention has to do with an insulating ring or disk such as is commonly employed in electrically separating the canopy of an electrolier or other electric fixture from the wall or ceiling upon which the fixture is supported, and is an improvement upon the device shown in my Letters Patent of the United States No. 586,317, dated July 13, 1897.

The ring shown in the patent above referred to is provided with a series of alternate grooves and ridges of different diameters forming corrugations on the surface of the disk or ring. The edge of the canopy fits into one of these grooves, the grooves of various diameters affording opportunity for the use of the ring with canopies of different sizes. It has been found in practice that this ring becomes displaced if the canopy is loosened on the fixture, the ring sometimes dropping down, so that the edge of the canopy comes in contact with the wall, thus defeating the purpose for which the ring is provided. This is particularly the case where the insulating-ring is used with a fixture projecting from a vertical wall, so that the ring is in a substantially vertical plane.

My invention has for its object to provide a ring which may be used with one or more sizes of canopies, but which shall not be subject to the objection just mentioned and which shall remain in its proper position even though the canopies become somewhat loosened from the fixture. My improved ring may also be used with canopies which vary slightly in size or which for any reason are not exactly circular at the edge which comes in contact with the ring.

The invention will be fully understood from the following description, in which reference is made to the accompanying drawings, and the novel features thereof are pointed out and clearly defined in the claims at the end of this specification.

Figure 1:
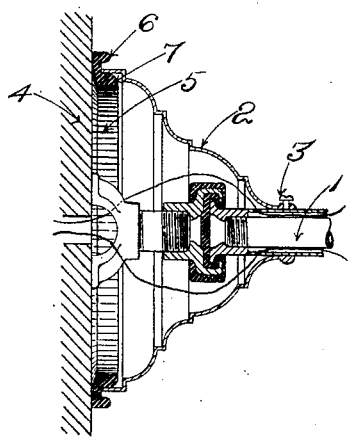
Figure 2:
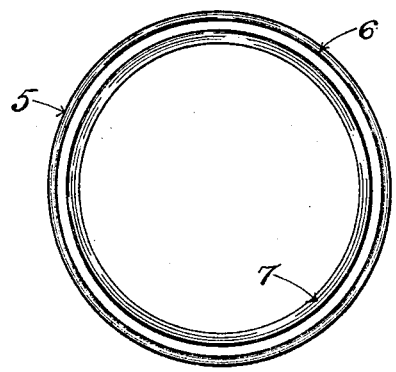
Figure 3:
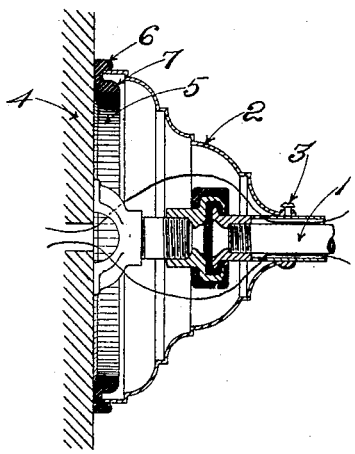

In the drawings, Figure 1 is a section of a canopy and an insulating-ring embodying my invention in place on a wall. Fig. 2 is a plan view of the insulator embodying my invention. Fig. 3 is a section showing a ring embodying my invention having a canopy of a different size applied thereto.

Referring now to the drawings, and more particularly to Fig. 1, the pipe of the fixture is indicated at 1 and the canopy by 2, the canopy being held in place upon the pipe by a set-screw 3 or by other suitable means. The wall is indicated at 4. Between the wall 4 and the canopy 2 I place the insulating-ring 5, in the same manner as is shown in my patent previously referred to. The insulating-ring 5 is made from some suitable insulating material, preferably an insulating composition, which may be molded to shape. This ring 5 is formed, as shown by its cross-section in Fig. 1, with two ribs or beads, one indicated by the numeral 6 about its outer periphery and the other, 7, about is inner periphery. The said inner rib 7 is of a height considerably greater than the outer rib 6 and is adapted to fit closely against the interior surface of the canopy 2, this being the smallest size of canopy which can be used with the particular ring. The outer surface of the next larger size of canopy (see Fig. 3) will fit against the other rib 6, (which has a larger diameter than the higher rib 7,) the intervening space between the two ribs being equal to the difference in radius between the two sizes of canopies which are intended to be used with this ring. By this means I am enabled to make a ring which will fit either of two sizes of canopies from a very small amount of material.

I find that by making the inner rib 7 considerably higher than the outer rib 6 the ring 5 is less likely to become displaced if the canopy becomes loosened upon the fixture, as is often the case, since it is necessary that the edge of the canopy be lifted completely off or away from the adjacent edge of a higher rib 7 before the parts can become separated. This construction insures greater safety, since the insulating-ring is not likely to become displaced even by careless handling.

What I claim is—

1. The improved insulator for electric-light-fixture canopies comprising two ribs separated by an intervening depression, the outer edge of one rib being adapted to engage the inside edge of a canopy of one size, and the inner edge of the other rib being adapted to engage the outside edge of a canopy of another size, whereby the insulator may be used with more than one size of canopy.

2. The improved insulator for electric-light-fixture canopies comprising two ribs of which the inner is the higher separated by an intervening depression, the outer edge of one rib being adapted to engage the inside edge of a canopy of one size and the inner edge of the other rib being adapted to engage the outside edge of a canopy of another size, whereby the insulator may be used with more than one size of canopy.

In testimony whereof I affix my signature in presence of two witnesses.

LOUIS McCARTHY.

Witnesses:
GEORGE P. DIKE,
ALICE H. MORRISON.